United States Patent

[11] 3,627,769

[72] Inventors Walter Schindler
 Riehen, near Basel;
 Armin Zust, Birsfelden, near Basel, both of Switzerland
[21] Appl. No. 832,022
[22] Filed June 10, 1969
[45] Patented Dec. 14, 1971
[73] Assignee Geigy Chemical Corporation
 Ardsley, N.Y.
[32] Priority June 20, 1968
[33] Switzerland
[31] 9210/68

[54] 1-(4,5-DIHYDROTHIENO[2,3-B] [1] BENZOTHIEPIN-4-YL)-PIPERAZINES
 2 Claims, No Drawings
[52] U.S. Cl..................................................... 260/268 TR,
 260/329 HS, 424/250
[51] Int. Cl...................................................... C07d 51/70
[50] Field of Search............................................ 260/268
 TR, 329 F, 329 HS, 329 S

[56] References Cited
 UNITED STATES PATENTS
3,359,271 12/1967 Schindler et al. ............. 260/268
3,487,085 12/1969 Protiva ........................ 260/268
 FOREIGN PATENTS
1,081,300 8/1967 Great Britain ................ 260/268

Primary Examiner—Donald G. Daus
Attorneys—Karl F. Jorda and Bruce M. Collins

ABSTRACT: 1-(4,5-Dihydrothieno[2,3-b] [1] benzothiepin-4-yl)-piperazine and the pharmaceutically acceptable acid addition salts thereof, exhibit central nervous system depressant effects, pharmaceutical compositions comprising said compound or a pharmaceutically acceptable acid addition salt thereof and a method for producing central nervous system depressant effects in a mammal comprising administering an effective amount of said compound or a pharmaceutically acceptable acid addition salt thereof.

1-(4,5-DIHYDROTHIENO[2,3-B] [1] BENZOTHIEPIN-4-YL)-PIPERAZINES

The present invention relates to 1-(4,5-dihydrothieno [2,3-b][1]benzothiepin-4-yl)-piperazine and the pharmaceutically acceptable acid addition salts thereof, as well as pharmaceutical compositions comprising this compound and the use thereof.

In accordance with the present invention, it has been found that 1-(4,5-dihydrothieno[2,3-b][1]benzothiepin-4-yl)-piperazine having the formula I

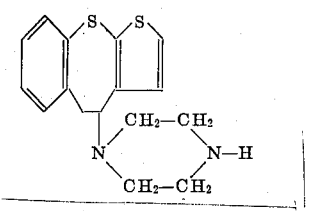

and the pharmaceutically acceptable acid addition salts thereof possess valuable central nervous system depressant activity on oral, rectal or parenteral administration.

In accordance with the foregoing, the present invention provides in a further aspect, a pharmaceutical composition comprising an effective amount of 1-(4,5-dihydrothieno[2,3-b][1]benzothiepin-4-yl)-piperazine or a pharmaceutically acceptable acid addition salt thereof, together with an inert pharmaceutical carrier. Additionally, the present invention also provides a method for producing central nervous system depressant effects in a mammal which comprises administering to said mammal an effective amount of 1-(4,5-dihydrothieno[2,3-b][1]benzothiepin-4-yl)-piperazine or a pharmaceutically acceptable acid addition salt thereof.

The compound of the present invention and its pharmaceutically acceptable acid addition salts may be administered, e.g., orally, rectally or parenterally. In particular, this compound and its salts have been found to potentiate the action of anesthetics, inhibit motility and exhibit hypnotic and antiemetic action. They prevent reflexes, have a tranquilizing effect on the fighting mouse and also exhibit antihistaminic action and sympathicolytic activity. In comparison with the aforesaid central depressant properties, the compound of the invention has only an insignificant cataleptic inherent activity. These properties, in combination with a favorably low toxicity, render the subject compound and its pharmaceutically acceptable acid addition salts suitable for the treatment of conditions of tension and agitation which are caused, for example, by neurosis, depression or schizophrenia.

The compound and its salts are also particularly suitable for use as hypnotics.

The above-mentioned pharmacological properties of the compound of the invention may be demonstrated in experimental animals by various standard test methods [cp. R. Domenjos and W. Theobald, Arch.int.Pharmacodyn.120, 450 (1959); W. Theobald et. al. Arch.int.Pharmacodyn.148, 560 (1964); W. Theobald et al. Arzneimittelforschung, 17, 561 (1967)].

Thus it may be illustratively demonstrated that on intraperitoneal administration anesthetized about 0.77 mg./kg. of 1-(4,5-dihydrothieno[2,3-b][1]benzothiepin-4-yl)-piperazine bismethane sulfonate to mice spontaneous orientation motility is decreased to a considerable extent. Subcutaneous administration of the same compound in amounts of about 0.09 mg./kg. to mice, prevents a notably high percentage of the animals, hanging on to a wire with their front paws, from pulling up and gripping the wire with their hind paws (test de la traction), while subcutaneous administration of from about 0.05 to 0.5 mg./kg. of this compound to mice anesthetized by intraperitoneal injection of 40 mg./kg. of the short-acting anesthetic N,N-diethyl-2-methoxy-4-allyl-phenoxyacetic acid amide potentiates, i.e., prolongs, the effect of the anesthetic to a significant extent.

The hypnotic activity of the compound of the present invention may be demonstrated by the observation test in mice [e.p. Samuel Irwin, Science 136, 123–128 (1962)]. In this test an $ED_{50}$ of about 0.2 mg./kg. may be observed on intraperitoneal administration.

In addition to the foregoing, the antiemetic activity of the compound of the invention as determined in golden hamsters and in dogs is found to be very pronounced, while the cataleptic activity, determined in rats, is found to be only moderate.

The toxicity of the compound of the invention as demonstrated in mice on intravenous administration is of favorably low order.

The subject 1-(4,5-dihydrothieno[2,3-b][1]-benzothiepin-4-yl)-piperazine is produced by reacting a reactive ester of 4,5-dihydrothieno[2,3-b][1]benzothiepin-4-ol having the formula II

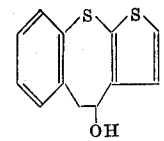

with a compound of the formula III

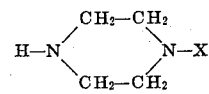

wherein X represents hydrogen or a radical which, by means of hydrolysis, can be replaced by hydrogen, or with an alkali metal derivative of a compound of the formula III, when required, hydrolyzing a compound thus obtained to convert the group X to hydrogen and, optionally, converting the obtained 1-(4,5-di-hydrothieno[2,-b][1]benzothiepin-4-yl)-piperazine into a pharmaceutically acceptable acid addition salt thereof.

Suitable reactive esters of the compound of the formula II are the halides, especially the chloride, also the sulfonic acid esters such as, e.g., the methane sulfonic acid ester and toluene sulfonic acid esters. Said starting material of formula II and its reactive esters, especially the chloride, is produced as described in U.S. Pat. No. 3,487,085.

The reaction, according to the invention, of the starting materials, the reactive esters of the compound of the formula II, is preferably performed in inert solvents, e.g., in hydrocarbons such as benzene, in lower alkanols such as methanol or ethanol, in lower alkanones such as acetone or methylethyl ketone, or also in water. The compound of the formula III can be added in excess as an acid-binding agent, or a tertiary base, such as triethylamine, may be used for this purpose. Optionally the bases used can also serve as the sole reaction medium. Depending on the constitution of the reaction components used, the reaction proceeds to a varying degree exothermically and, if necessary, it is completed by heating.

If, instead of a compound of the formula III, an alkali metal derivative of such compound is used for the reaction according to the invention, e.g., a sodium, potassium, or lithium derivative, then the reaction is preferably carried out in a hydrocarbon, such as benzene or toluene.

Replacement of a group X in the product obtained to give the product 1-(4,5-dihydrothieno[2,3-b ][1]benzothiepin-4-yl) piperazine, is performed by hydrolysis.

Groups which can be converted by hydrolysis into the hydrogen atom, are acyl radicals, e.g., lower alkanoyl groups such as the acetyl group, arylcarbonyl groups such as the benzoyl group, radicals of monofunctional derivatives of carbonic acid or thiocarbonic acid such as, e.g., the methoxycarbonyl, ethoxycarbonyl, phenoxycarbonyl or the benzyloxycarbonyl group, or the corresponding thiocarbonyl groups. The hydrolysis is performed using an alkali metal hydroxide, e.g., potassium or sodium hydroxide, at elevated temperature, either in a higher boiling organic solvent containing hydroxyl groups such as, e.g., ethylene glycol or diethylene glycol, or in a lower monoalkyl ether of such a glycol, and also in a lower alkanol. If a lower alkanol is used, then the reaction is preferably carried out in a closed vessel. Furthermore, the hydrolysis can also be performed, for example, by boiling with alkanolic hydrochloric acid.

4-Chloro-4,5-dihydrothieno[2,3-b][1]benzothiepin, which may be used as starting material (i.e., as a reactive ester of the compound of the formula I) is described in the literature.

A further reactive ester of the compound of the formula II, i.e., 4-bromo-4,5-dihydrothieno[2,3-b][1]benzothiepin, can be produced analogously.

Optionally, the 1-(4,5-dihydrothieno[2,3-b][1]benzothiepin-4-yl)-piperazine obtained using the process according to the invention, is subsequently converted, in the usual manner, into its addition salts with inorganic and organic acids. For example, the acid desired as a salt component, or a solution of the acid, is added to a solution of the 1-(4,5-dihydrothieno[2,3-b][1]benzothiepin-4-yl)-piperazine in an organic solvent. For the reaction, it is preferable to use organic solvents, in which the salt obtained is difficulty soluble, so that it can be separated by filtration. Such solvents are, e.g., methanol, acetone, methylethyl ketone, acetone/ethanol, methanol/ether or ethanol/ether.

For use as medicaments it is possible to use, instead of the free base, the pharmaceutically acceptable acid addition salts thereof, i.e., salts with acids, the anions of which are not toxic in the case of the dosages in question. Furthermore, it is of advantage if the salts, which are to be used as medicaments, readily crystallize and are not, or are only slightly, hygroscopic. For salt formation with 1-(4,5-dihydrothieno[2,3-b][1]benzothiepin-4-yl)-piperazine, it is possible to use, e.g., hydrochloric acid, hydrobromic acid, sulfuric acid, phosphoric acid, methane sulfonic acid, ethane sulfonic acid, β-hydroxyethane sulfonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid.

As mentioned above, the compound of the present invention may be administered orally, rectally or parenterally. The daily dosages of the free base, or of pharmaceutically acceptable salts thereof will vary depending upon the species, weight and age of the animal to be treated, upon the particular condition for which treatment is required and upon the mode of administration. In general, however, the daily dosage will vary between 0.15 to 12 mg./kg. for warm-blooded animals. Suitable dosage units such as dragées, tablets, capsules, suppositories or ampuls preferably contain 5 to 50 mg. of the free base or of a pharmaceutically acceptable acid addition salt thereof.

Dosage units for oral administration preferably contain as active substance between 1 to 90 percent of a compound of the formula I or of a pharmaceutically acceptable acid addition salt thereof. They are produced by combining the active substance with, e.g., solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The latter are coated, e.g., with concentrated sugar solutions, which can also contain, e.g., gum arabic, talcum and/or titanium dioxide, or with a lacquer dissolved in easily volatile organic solvents or mixtures of solvents. Dyestuffs can be added to these coatings, e.g., to distinguish between varying dosages of active substance.

Other suitable dosage units for oral administration are hard capsules made of gelatine as well as soft, closed capsules made of gelatine and a softener such as glycerin. The hard capsules preferably contain the active substance as a granulate, e.g., in admixture with fillers such as maize starch, and/or lubricants such as talcum or magnesium stearate and, optionally, stabilizers such as sodium metabisulphite ($Na_2S_2O_5$) or ascorbic acid. In soft capsules, the active substance is preferably dissolved or suspended in suitable liquids such as liquid polyethylene glycols, whereby stabilizers can also be added.

Suitable dosage units for rectal administration are, for example, suppositories, consisting of a combination of the base, or of a suitable salt thereof, with a fatty foundation substance. Also suitable are gelatine rectal capsules containing a combination of the base, or of a suitable salt thereof, with polyethylene glycol.

Ampuls for parenteral, especially intramuscular administration, preferably contain a water-soluble salt of the base in a concentration of preferably 0.5 to 5 percent, optionally together with suitable stabilizing agents and buffer substances, in an aqueous solution.

The following examples will serve to further typify the nature of the present invention, but should not be construed as limiting the scope thereof. All temperatures are given in degrees centigrade.

EXAMPLE 1 a. 12 g. (0.05 mol) of 4-chloro-4,5-dihydrothieno[2,3-b][1]benzothiepin (prepared as described in U.S. Pat. No. 3,487,085) are dissolved in 20 ml. of absolute benzene. This solution is added dropwise at 20° to 17.2 g. (0.2 mol) of piperazine in 30 ml. of absolute benzene and the reaction mixture is refluxed for 8 hours. The mixture is then cooled to room temperature, whereupon 200 ml. of water and 5 ml. of concentrated sodium hydroxide solution are added and the mixture is then extracted with ether/methylene chloride (2:1). The organic phase is shaken out with a molar methane sulfonic acid solution, the acid extracts are made alkaline with concentrated sodium hydroxide solution and the free base is extracted with methylene chloride. The methylene chloride extract is washed with water, dried over magnesium sulfate and concentrated by evaporation in vacuo. The obtained oily residue is purified by means of elution chromatography on a column of 200 g. of silica gel "Merck" (0.05– 0.2 mm. particle size) with benzene, acetone and triethylamine (80:20:2). The obtained pure 1-(4,5-dihydrothieno[2,3-b][1]benzothiepin-4-yl)-piperazine melts at 126°–128°. 9.1 g.(0.03 mol) of the base obtained are dissolved in 30 ml. of methylethyl ketone and then treated dropwise with a solution of 5.77 g. (0.06 mol) of methane sulfonic acid in 20 ml. of methylethyl ketone. After completion of the addition, 50 ml. of absolute diethyl ether are added and the precipitate is removed by filtration. After recrystallization from 90 percent ethanol and ethyl acetate, the pure 1-(4,5-dihydro-thieno[2,3-b][1]benzothiepin-4-yl)-piperazine-bis-methane sulfonate melts at 182°–184°.

The same end product is obtained, using a sulfonic acid ester, in the following manner:

b. 14.04 g. (0.06 mol) of 4-hydroxy-4,5-dihydro-thieno[2,3-b][1]benzothiepin are dissolved in 30 ml. of benzene and then treated dropwise at −10° with a solution of 7.6 g. (0.066 mol) of methane sulfonic acid chloride in 5 ml. of benzene. After stirring the reaction mixture for 2 hours at −10°, it is added dropwise at 0° to a solution of 20.8 g. (0.24 mol) of piperazine in 100 ml. of benzene. The resulting solution is warmed during the course of 1 hour to room temperature and then refluxed for 4 hours.

The reaction mixture is then poured into 200 ml. of ice water and, after the addition of 60 ml. of 2 N sodium hydroxide solution, is shaken out with benzene. The benzene extracts are washed six times with water and then concentrated to dryness in vacuo.

The residue is taken up in benzene and shaken out with 150 ml. of a 1 molar aqueous methane sulfonic acid solution. The acidic, aqueous extracts are alkalized with concentrated sodium hydroxide solution, shaken out with benzene and washed with water. After drying over magnesium sulfate, the benzene is removed in vacuo and the partially crystalline residue obtained is purified by elution chromatography on a column of 100 g. of silica gel "Merck" (partial size 0.05–0.2 mm.) with benzene/acetone/triethyl amine (80:20:2). The pure 1-(4,5-dihydro-thieno[2,3-b ][1]benzothiepin-4-yl)-piperazine obtained, after recrystallizing from a little benzene and a large amount of petroleum ether, melts at 126°–128°.

EXAMPLE 2 a. 10.4 g. (0.0278 mol) of 4-(4,5-dihydrothieno [2,3-b][1]benzothiepin-4-yl)-1-piperazine carboxylic acid ethyl ester are added to a solution of 18 g. (0.316 mol) of potassium hydroxide in 100 ml. of absolute ethanol. The mixture is refluxed for 12 hours, diluted with 50 ml. of water, the ethanol evaporated off in vacuo and the residue extracted with ether/methylene chloride (2:1). The organic phase is dried over magnesium sulfate and is concentrated by evaporation in vacuo. The residue is recrystallized from ligroin/acetic acid ethyl ester, whereupon the 1-(4,5-dihydrothieno[2,3-b][1]benzothiepin-4-yl)-piperazine melts at 126°–128°.

The starting compound, the 4-(4,5-dihydrothieno[2,3-b][1]benzothiepin-4-yl)-1-piperazine carboxylic acid ethyl ester, is produced as follows:

b. 12.6 g. (0.05 mol) of 4-chlorothieno[2,3-b][1]benzothiepin are added to a solution of 23.6 g. (0.15 mol) of 1-piperazine carboxylic acid ethyl ester in 20 ml. of benzene. The mixture is refluxed for 5 hours, taken up in 200 ml. of water and 5 ml. of concentrated sodium hydroxide solution and extracted with ether/methylene chloride (2:1). The organic phase is washed four times with water, is dried over magnesium sulfate and concentrated by evaporation in vacuo. The obtained crude 4-(4,5-dihydrothieno [2,3-b][1] benzothiepin-4-yl)-1-piperazine carboxylic acid ester melts at 118°–125° and the pure compound, after recrystallization from isopropanol/petroleum ether, melts at 136°–138°.

This starting compound can also be obtained as follows: 3.5 g. (0.015 mol) of 4-hydroxy-4,5-dihydro-thieno[2,3-b][1]benzothiepin are dissolved in 8 ml. of pyridine and then added dropwise at −10° to a solution of 1.9 g. (0.016 mol) of methane sulfonic acid chloride in 2 ml. of absolute benzene. After stirring the reaction mixture for 2 hours at −10° it is added dropwise at 0° to a solution of 9.5 g. (0.06 mol) of 1-piperazine-carboxylic acid ethyl ester in 40 ml. of absolute benzene. The resulting solution is warmed during the course of 1 hour to room temperature and then refluxed for 4 hours.

The reaction mixture is poured into 100 ml. of ice water, treated with 15 ml. of 2 N sodium hydroxide solution and then shaken out with benzene. The organic phase is washed six times with water, dried over magnesium sulfate, and concentrated to dryness under vacuum. The resulting crystalline residue is dried in high vacuum and recrystallized from isopropanol/petroleum ether. The pure 4-(4,5-dihydro-thieno[2,3-b][1]benzothiepin-4-yl)-1-piperazine-carboxylic acid ethyl ester melts at 136°–138°.

The same compound can furthermore also be obtained as follows:

d. 7.9 g. (0.05 mol) of 1-piperazine-carboxylic acid ethyl ester are dissolved in 50 ml. of absolute benzene and then treated dropwise at 0° under nitrogen with a solution of 3.5 g. (0.055 mol) of butyl lithium in 20 ml. of hexane.
The reaction mixture is slowly warmed to room temperature and then stirred for 2 hours more at 40°. The mixture obtained is again cooled to 0° and treated dropwise with a solution of 12.6 g. (0.05 mol) of 4-chloro-4,5-dihydro-thieno[2,3-b][1]benzothiepin in 50 ml. of absolute benzene. The reaction vessel is then slowly heated during about 3 hours up to the reflux temperature of the reaction mixture. The mixture is then refluxed for 4 hours and, after cooling, poured into 200 ml. of ice water. After the addition of 25 ml. of 2 N sodium hydroxide solution, the mixture is shaken out with benzene, the organic phase is washed with water and dried over magnesium sulfate. The solvent is removed under vacuum and the residue obtained is recrystallized from isopropanol/petroleum ether. The pure 4-(4,5-dihydro-thieno[2,3-b][1]benzothiepin-4-yl)-1-piperazine-carboxylic acid ethyl ester melts at 136°–138°.

EXAMPLE 3

250 g. of 1-(4,5-dihydrothieno[2,3-b][1]benzothiepin-4-yl)-piperazine are mixed with 175–80 g. of lactose and 169.70 g. of potato starch. The mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in. The mixture is then pressed into 10,000 tablets, each weighing 100 mg. and each containing 25 mg. of active substance. Optionally, the tablets can be provided with grooves for more accurate adjustment of the dosage amount.

EXAMPLE 4

A granulate is produced from 250 g. of 1-(4,5-dihydrothieno[2,3-b][1]benzothiepin-4-yl)-piperazine, 175–90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate, and the mixture is pressed into 10,000 dragee cores. These are subsequently coated with a concentrated syrup made from 502.28 g. of crystallized saccharose, 6 g. of shellac, 10 g. of gum arabic, 0.22 g. of dyestuff and 1.5 g. of titanium dioxide, and dried. The obtained dragées each weigh 120 mg. and each contain 25 mg. of active substance.

EXAMPLE 5

To produce 1,000 capsules each containing 25 mg. of active substance, 25 g. of 1-(4,5-dihydrothieno[2,3-b][1]benzothiepin-4yl)-piperazine are mixed with 249.0 g. of lactose. The mixture is evenly moistened with an aqueous solution of 2.0 g. of gelatine and is granulated through a suitable sieve e.g., Sieve No. III, Ph.Helv.V). The granulate is mixed with 10.0 g. of dried maize starch and 15.0 g. of talcum. The mixture is uniformly filled into 1,000 hard gelatine capsules, size 1.

EXAMPLE 6

A suppository foundation substance is prepared from 2.5 g. of 1-(4,5-dihydrothieno[2,3-b][1]benzothiepin-4-yl)-piperazine and 167.5 g. of adeps solidus. From this mixture are then filled 100 suppositories each containing 25 mg. of active substance.

EXAMPLE 7

A solution of 25 g. of 1-(4,5-dihydrothieno[2,3-b][1]benzothiepin-4-yl)-piperazine bis-methane sulfonate in 1 liter of water is filled into 1,000 ampuls and sterilized. An ampul contains a 2.5 percent solution of 25 mg. of active substance.

What is claimed is:

1. The compound of the formula

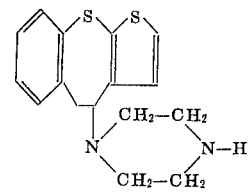

and the pharmaceutically acceptable acid addition salts thereof.

2. The bis-methane sulfonate of the compound defined in claim 1.

* * * * *